Sept. 29, 1970  E. A. BJERHAMMAR  3,531,206
SURVEYING INSTRUMENT

Filed Nov. 28, 1966  2 Sheets-Sheet 1

INVENTOR
EVERT A. BJERHAMMAR

BY Larson and Taylor
ATTORNEYS

United States Patent Office 3,531,206
Patented Sept. 29, 1970

3,531,206
SURVEYING INSTRUMENT
Evert Arne Bjerhammar, Brinken 3, Stocksund, Sweden
Filed Nov. 28, 1966, Ser. No. 597,323
Claims priority, application Sweden, Dec. 9, 1965, 15,936/65
Int. Cl. G01c 1/00
U.S. Cl. 356—144                                20 Claims

ABSTRACT OF THE DISCLOSURE

An optical instrument for ascertaining the vertical angle between a pair of optical axes. A telescope has an objective lens and a primary optical axis adjustable about a horizontal axis perpendicular to the primary optical axis, and first beam of light passing long the primary optical axis is visible at the objective lens. A first reflector deflects a second beam of light to the objective lens from a point on the horizontal axis; and a second reflector deflects the second beam along the horizontal axis to that point from a direction at right angles to the horizontal axis, wherein the path of the second beam of light forms a secondary optical axis of the telescope. The first and second reflectors are mounted in front of the objective lens of the telescope and the second reflector is rotatable about the horizontal axis relative to the first reflector. The vertical angle formed between the primary and secondary axes is indicated as a result of rotation of the second reflector relative to the first reflector.

---

This invention relates to an optical surveying instrument, and in particular it relates to an optical instrument for determining distance by measuring the size of an angle formed between a pair of lines which diverge from the optical instrument to two separate reference marks spaced apart vertically on a stadia rod located at a point remote from the optical instrument.

In the field of surveying it is quite common to determine the distance from a telescope mounting to a given remote point by measuring an angle formed between two lines which diverge from a point at the telescope to two marks on a stadia rod and spaced apart vertically by a known amount. However, in previous instruments it was necessary to employ two separate telescopes, one for each line of the said pair of lines.

A primary purpose of the present invention is to provide an instrument of the type referred to wherein simultaneous observation of both marks are possible with the use of a single telescope. Another purpose of the present invention is to provide a measuring means associated with the single telescope instrument for immediately determining either the angle between the lines, the elevation of either mark and/or the distance from the telescope to the remote point.

The surveying instrument according to the present invention includes a telescope having a primary optical axis and a secondary optical axis, both of which axes are visible in the objective lens of the telescope. A first beam of light passes directly from one point on the stadia rod through the instrument along the primary optical axis to the objective lens. A second beam of light from the other point on the stadia rod passes through the instrument along a secondary optical axis along which the beam is deflected into the objective lens alongside the first beam of light passing along the primary optical axis. Measuring means are connected to the second beam deflecting means for indicating the amount of deflection required to bring the secondary optical axis into horizontal alignment with the primary optical axis.

The measuring means includes first and second guide members each having a straight edge. One guide member is connected to the telescope, including the objective lens, while the other guide member is connected to the second beam deflecting means. The guide members are so formed that the angle formed by the two straight edges equals the angle between the primary and secondary optical axes.

The invention also includes an adjusting means for regulating and ascertaining the angle formed between the two straight edges. This adjusting means includes a pair of rollers mounted between and engageable with the straight edges and a carriage for carrying said rollers and movable in response to movement of a vertically slidable guide bar. Briefly, the operation of the instrument is as follows. The telescope is rotated about a horizontal axis until one mark on the stadia rod is visible along the primary optical axis in the objective lens. The deflecting means is then rotated about the same horizontal axis until the other mark on the stadia rod is visible in the objective lens along the secondary optical axis and is horizontally aligned with the first mark. Following this rotation of the telescope and the deflecting means the straight edges of the guide members will then form an angle equal to the angle between the two lines.

Thus, it is an object of this invention to provide an improved optical surveying instrument in which two beams of light from two separate vertically spaced marks may be observed simultaneously through a single telescope.

It is another object of this invention to provide an improved adjusting means and measuring means associated with a single telescope surveying instrument for immediately and easily ascertaining the distance between the telescope mounting and a remote point.

It is another object of this invention to provide an improved optical surveying instrument, the accuracy of which is not diminished by changes in temperature.

Other objects and the attendant advantages of the present invention will become apparent from the detailed description to follow together with the attached drawings which show a preferred embodiment of the present invention wherein.

Figure 1:
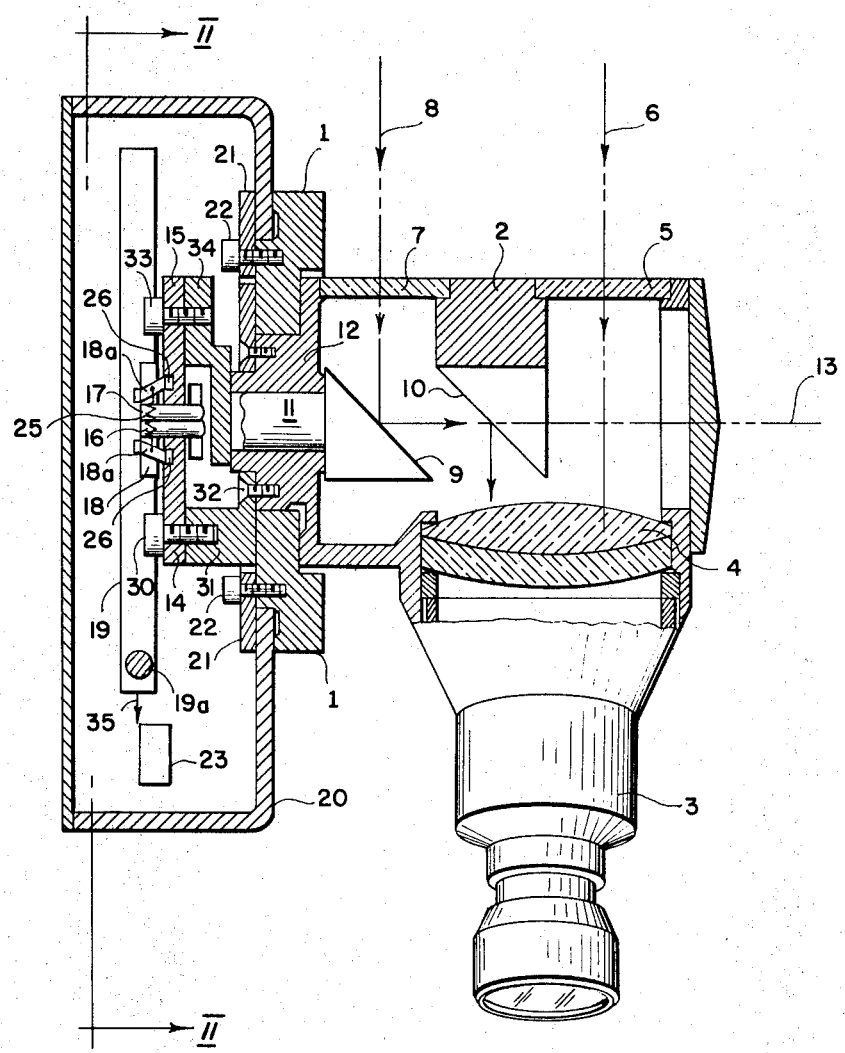
FIG. 1 is a top view partially in section of an optical surveying instrument according to the present invention.

Referring to the drawings there is shown in FIG. 1 a portion 1 of a base plate on which the instrument is mounted. This base plate may be mounted on a stand such as a tripod (not shown) which may include the usual arrangement for horizontally and vertically aligning the surveying instrument. When the horizontal alignment is accurate the portion 1 of the base plate as shown in FIG. 1 will be vertical. A telescope housing 2 is attached to the base plate 1. The housing 2 contains a telescope 3 having an objective lens 4. In front of the objective lens 4 is provided a first window 5 for receiving a first beam of light which passes along the primary optical axis 6 of the telescope to the lens 4. A second window 7 is located adjacent window 5 for receiving a second beam of light which passes along the secondary optical axis 8 of the telescope to the lens 4. This second beam of light, after passing through the window 7, is deflected twice, first by a reflecting surface 9 and secondly by a reflecting surface 10 before reaching the objective lens 4. The two beams of light pass through opposite sides of the objective lens 4 in such a manner that an observer at telescope 3 may view both beams of light simultaneously.

The telescope housing 2 and the telescope 3 are mounted to rotate about a horizontal axis 13. The reflector 10 is fixedly mounted in the housing 2 while the reflector 9 is mounted on a shaft 11 which is journalled in a trunnion portion 12 of the housing 2 for rotation about the same horizontal axis 13 about which the housing 2 rotates.

With this arrangement the operator rotates the housing 2 and telescope 3 about axis 13 until a first mark is visible along the primary optical axis 6 at the objective lens 4. The operator then rotates the reflecting surface 9 about axis 13 until the second mark is visible along the secondary optical axis 8 at a level which is horizontally aligned with the primary optical axis 6. In a manner to be described in more detail below, it is then possible, with the instrument in this position, to ascertain the linear distance from the optical instrument to the remote point whereat the two marks are located.

Figure 2:
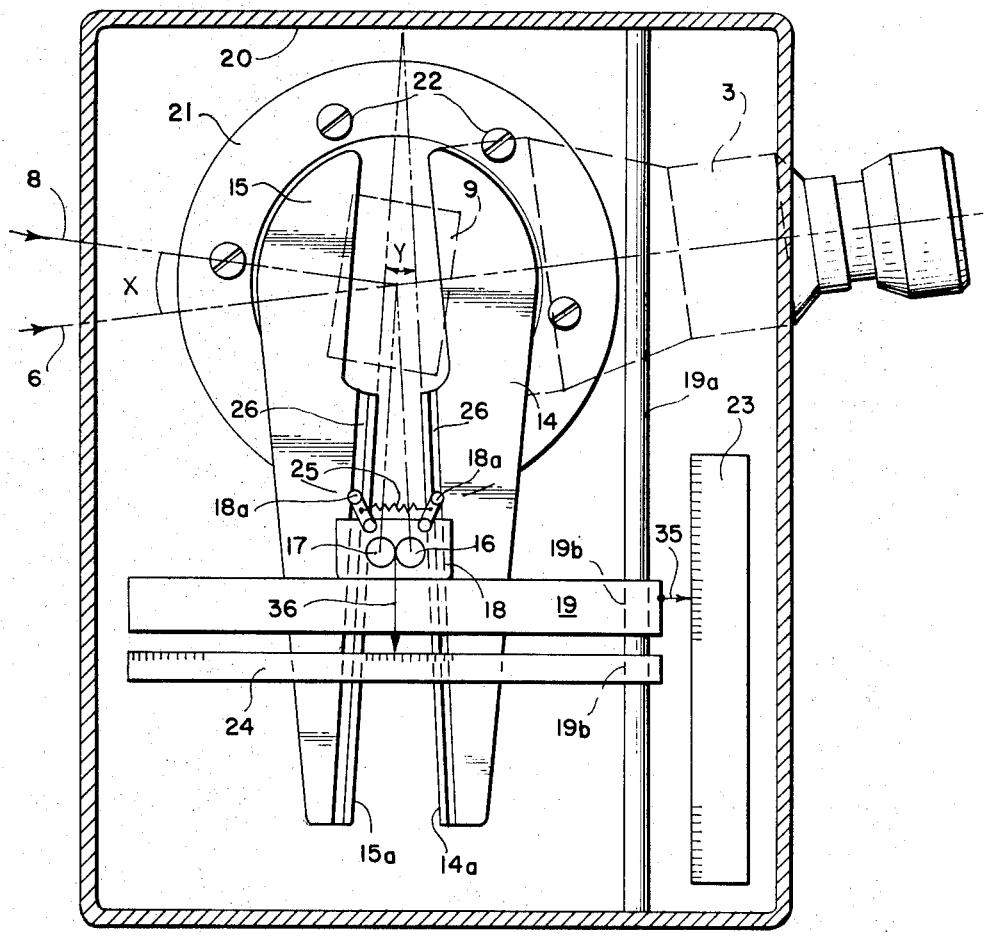
FIG. 2 is a side-elevational view taken along line II—II in FIG. 1.

FIG. 2 illustrates the means for carrying out the adjusting and measuring functions of the invention.

A pair of guide members 14 and 15 are mounted on the instrument within a casing 20. The guide member 14, which has a straight-edge 14a, is connected by a screw 30 to an intermediate member 31 which is connected by a screw 32 directly to the housing 2. Thus the guide member 14 will move with the housing member 2 as the latter is rotated. A second guide member 15, having a straight-edge 15a is rigidly connected to the reflecting surface 9 through screw 33 and intermediate member 34. The casing 20 is rigidly held to the portion 1 of the base plate by flanges 21 and screws 22.

With the guide members so mounted it can be seen that the angle Y formed by the straight edges 14a and 15a will equal the angle X (see FIG. 2) formed between the primary optical axis 6 and the secondary optical axis 8.

The means for adjusting and measuring the angle formed between straight edges 14a and 15a is mounted in the casing 20. A pair of rollers 16 and 17 are mounted in a carriage 18 which is in turn held to the guide members 14 and 15 by links 18a connected to the carriage at the one end and slidable within grooves 26 at the other end. A spring 25 between the two links 18a urges the straight edges 14a and 15a of the guide members 14 and 15 into engagement with rollers 16 and 17.

The carriage 18 is horizontally slidable relative to a guide bar 19 on which it rests. This guide bar 19 is journalled on a vertical shaft 19a for vertical movement therealong. Associated with guide bar 19 is an indicator 35 movable therewith and a fixed scale 23. An additional scale 24 is provided for cooperation with an indicator 36 for measuring the relative horizontal movement between carriage 18 and guide bar 19.

In order to achieve a high degree of accuracy, it is preferable to have the essential components of the instrument made of one and the same material, so as to reduce the influence of thermal expansion. In particular, it is preferable for the housing 2, the reflectors 9 and 10, the shaft 11 and the guide members 14 and 15 as well as the parts connecting them together, to be one and the same metallic material, preferably one of as low a coefficient of thermal expansion as possible. Also rollers 16 and 17 may be of this material. The material may be for example, an iron-nickel alloy of low thermal expansion.

It can be seen in FIG. 2 that the carriage 18 will be urged upwardly by spring means 25 acting on links 18a until the two rollers 16 and 17, with their respective axes lying in the same horizontal plane, abut the surfaces of straight edges 14a and 15a. If the guide bar 19 is positioned immediately below the carriage 18 before and after vertical movement thereof, then the amount of vertical movement of the bar 19 will be indicated on scale 23 by indicator 35. This scale 23 may be calibrated to indicate the size of the angle formed by the edges 14a and 15a; or it may be calibrated directly in units of distance. Similarly, the relative horizontal movement of carriage 18 with respect to guide bar 19 is indicated on scale 24 by indicator 36. This will give an indication of the amount by which the guide member has been rotated from its initial position and it will be proportional to the elevation of the marks.

It can be seen that any appropriate means may be employed for adjusting the guide member 15. For example, a manually operable means may be connected either to the shaft 11, the guide member 15 or to the guide bar 19. In the first two alternatives, as the guide member 15 is rotated the carriage 18 and guide member 19 will be urged upwardly by the spring means 25. In a preferred embodiment of the invention, however, the manually operable means will be connected directly to guide bar 19 so that rotation of reflecting means 9 and guide bar 15 will be effected by vertical upward movement of carriage 18 and the guide bar 19. It may be provided, for example, by forming the shaft 19a as a screw engageable with internal threads in bore 19b.

The invention has been described in considerable detail above with respect to a preferred embodiment thereof. However, it should be apparent that numerous modifications and variations are possible within the spirit and scope of the invention as defined within the appended claims wherein.

I claim:

1. An optical instrument for ascertaining the vertical angle between a pair of optical axes comprising: a telescope having an objective lens and a primary optical axis adjustable about a horizontal axis perpendicular to said primary optical axis, wherein a first beam of light passing along said primary optical axis is visible at the objective lens, a first reflector means for deflecting a second beam of light to the objective lens from a point on the said horizontal axis, a second reflector means for deflecting said second beam along the horizontal axis to said point from a direction at right angles to said horizontal axis, the path of said second beam of light forming a secondary optical axis of the telescope, said first and second reflector means being mounted in front of the objective lens of the telescope and the second reflector means being rotatable about said horizontal axis relative to the first reflector means, and measuring means connected to said telescope and to said second reflector means for indicating the vertical angle formed between the said primary and secondary axes as a result of rotation of the second reflector means relative to said first reflector means.

2. An optical instrument as claimed in claim 1 wherein said measuring means includes a first guide member connected to said telescope and having a first edge, a second guide member connected to said second reflector means and having a second edge, wherein the position of one of said edges relative to the other is proportional to the angle formed between said optical axes.

3. An optical instrument as claimed in claim 2 wherein the said edges are straight edges and the angle formed by said straight edges is substantially equal to the angle formed between said optical axes.

4. An optical instrument as claimed in claim 3 including adjusting means for adjusting the angle formed between said straight edges.

5. An optical instrument as claimed in claim 4 wherein said adjusting means includes a pair of rollers mounted between said straight edges, said rollers being movable between said straight edges towards and away from the apex of the angle formed by said straight edges.

6. An optical instrument as claimed in claim 5 wherein said rollers are in engagement with each other.

7. An optical instrument as claimed in claim 5 in which said rollers are mounted in a carriage, and including a mounting means for mounting said carriage on said guide members so that the orientation of said carriage about its own axis remains unchanged while the carriage moves to carry said rollers towards and away from the apex of the angle formed by said straight edges.

8. An optical instrument as claimed in claim 7 including a guide bar mounted for vertical movement, said bar having at least one horizontal surface, wherein said carriage rests on said horizontal surface.

9. An optical instrument as claimed in claim 8 including a first indicator and scale operatively mounted relative to the guide bar to indicate the vertical movement of the guide bar and thereby indicating the size of the angle formed between said straight edges.

10. An optical instrument as claimed in claim 9 including a second indicator and scale operatively mounted relative to said guide bar to indicate the horizontal movement of said carriage relative to said guide bar thereby indicating the distance which the straight edges move from an initial position.

11. An optical instrument as claimed in claim 7 including resilient means mounted on said carriage for urging the straight edges and the rollers toward each other.

12. An optical instrument as claimed in claim 7 wherein said mounting means includes a groove on each guide member generally parallel to the straight edge thereof, and a pair of link means pivotally connected to said carriage and slidable one in each groove for allowing sliding movement of said carriage towards and away from said apex.

13. An optical instrument as claimed in claim 12 including resilient means connected to said link means for urging the straight edges and the rollers against each other.

14. An optical instrument as claimed in claim 13 including a guide bare mounted for vertical movement, said bar having at least one horizontal surface, wherein said carriage rests on said horizontal surface.

15. An optical instrument as claimed in claim 14 including a first indicator and scale operatively mounted relative to the guide bar to indicate the vertical movement of the guide bar and thereby indicating the size of the angle formed between said optical axes.

16. An optical instrument as claimed in claim 15 including a second indicator and scale operatively mounted relative to said guide bar to indicate the horizontal movement of said carriage relative to said guide bar thereby indicating the distance which the straight edges move from an initial position.

17. An optical instrument as claimed in claim 2 in which the said guide members and a means for connecting said first guide member with the telescope and said second guide member with the second reflector are of the same metallic material.

18. An optical instrument as claimed in claim 17 in which said metallic material is an iron-nickel alloy of low thermal expansion.

19. An optical instrument as claimed in claim 1 in which said reflectors are mounted in a housing supporting said telescope and said reflectors and said housing are formed of the same metallic material.

20. An optical instrument as claimed in claim 19 in which the said metallic material is an iron-nickel alloy of low thermal expansion.

References Cited

UNITED STATES PATENTS

| | | | |
|---|---|---|---|
| 2,378,282 | 6/1945 | Brueske | 356—17 |
| 2,401,746 | 6/1946 | Castedello | 356—22 |
| 2,464,141 | 3/1949 | Maier | 350—310 X |
| 2,484,072 | 10/1949 | Castedello | 356—22 |
| 3,044,344 | 7/1962 | Hartmeister. | |

RONALD L. WIBERT, Primary Examiner

F. L. EVANS, Assistant Examiner

U.S. Cl. X.R.

33—70; 356—17, 11